United States Patent [19]

Ovaert et al.

[11] Patent Number: 5,329,738
[45] Date of Patent: Jul. 19, 1994

[54] COMPOSITE STRUCTURE, ESPECIALLY FOR BUILDING

[76] Inventors: Francis Ovaert, 10 Boulevard Jourdan, Paris, France, 75014; Pierre Potet, Chateau de Rhodes, La Bastide de Seron, France, 09240

[21] Appl. No.: 879,262

[22] Filed: May 7, 1992

[30] Foreign Application Priority Data

May 7, 1991 [FR] France .................. 91 05609

[51] Int. Cl.[5] .................. F16B 25/00; E04B 1/62
[52] U.S. Cl. .................. 52/410; 52/509; 52/506.05; 411/387; 411/533
[58] Field of Search .................. 52/506, 509, 410; 411/399, 533, 970, 990, 387

[56] References Cited

U.S. PATENT DOCUMENTS

| | | |
|---|---|---|
| 3,850,073 | 11/1974 | Hayes . |
| 4,441,295 | 4/1984 | Kelly .................. 52/410 |
| 4,453,361 | 6/1984 | Hulsey .................. 52/506 |
| 4,590,728 | 5/1986 | Strömberg .................. 52/410 |
| 4,604,846 | 8/1986 | Ekstrom . |
| 4,651,490 | 3/1987 | Marston . |
| 4,726,164 | 2/1988 | Reinwall et al. .................. 52/410 |
| 4,736,561 | 4/1988 | Lehr et al. . |
| 4,749,322 | 6/1988 | Sygnator .................. 411/533 |
| 4,783,942 | 11/1988 | Nunley et al. .................. 52/410 |
| 4,787,775 | 11/1988 | Hammer . |
| 4,834,600 | 5/1989 | Lemke . |
| 4,932,819 | 6/1990 | Almeras . |
| 4,934,887 | 6/1990 | Sharp et al. . |
| 5,018,329 | 5/1991 | Hasan et al. . |
| 5,033,242 | 7/1991 | Borbely et al. . |

FOREIGN PATENT DOCUMENTS

| | | |
|---|---|---|
| 380732 | 6/1986 | Austria . |
| 1960604 | 8/1970 | Fed. Rep. of Germany . |
| 2617099 | 11/1976 | Fed. Rep. of Germany . |
| 2803709 | 8/1979 | Fed. Rep. of Germany . |
| 2838566 | 3/1980 | Fed. Rep. of Germany . |
| 3040794 | 5/1981 | Fed. Rep. of Germany . |
| 3515734 | 11/1986 | Fed. Rep. of Germany . |
| 2553836 | 4/1985 | France . |
| 2111115 | 6/1983 | United Kingdom . |
| 2122234 | 1/1984 | United Kingdom . |

Primary Examiner—Carl D. Friedman
Assistant Examiner—Christopher T. Kent
Attorney, Agent, or Firm—Wenderoth, Lind & Ponack

[57] ABSTRACT

An assembly member includes a rod having at one end thereof a head for driving the rod in rotation, a threaded part at an opposite end and, between the threaded part and the head, a smooth part the diameter of which is markedly larger than a threadroot diameter of the threaded part. Such member is used for the fastening of insulating layers of facade coverings or claddings.

16 Claims, 2 Drawing Sheets

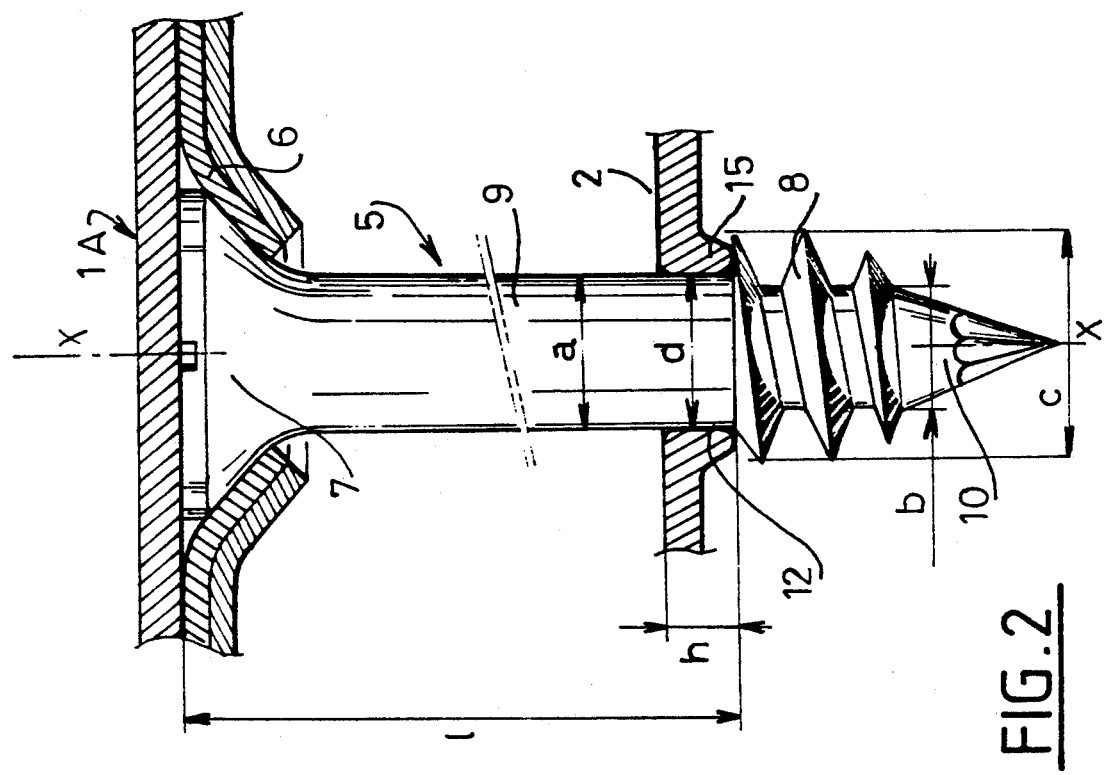
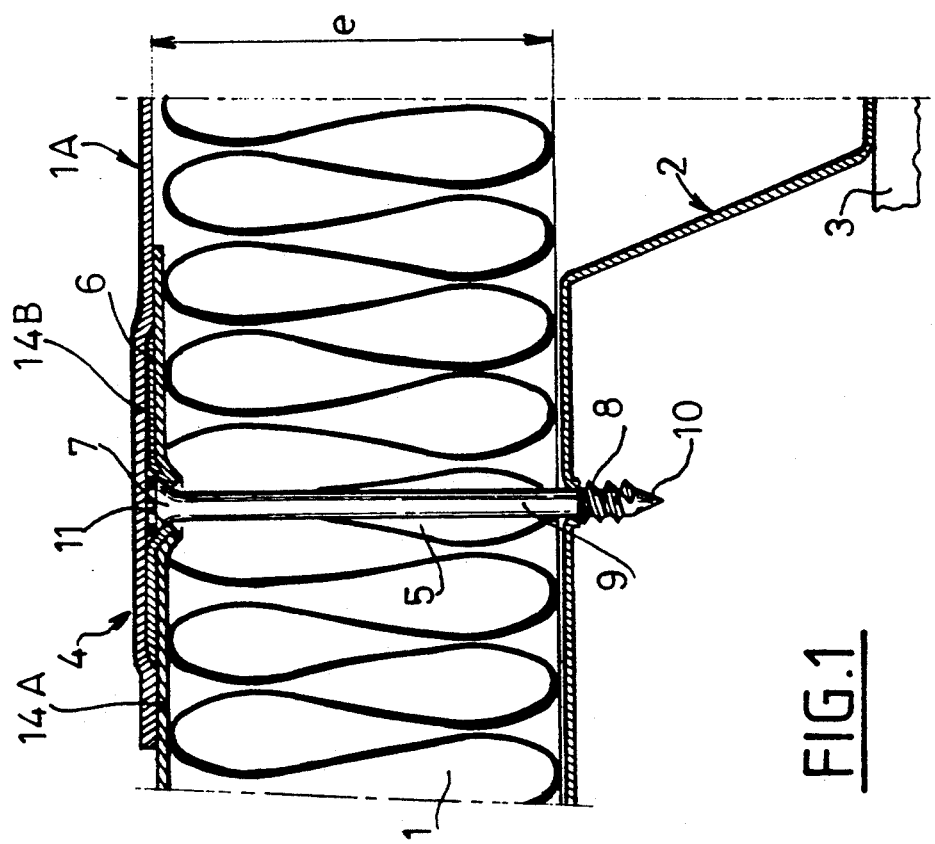

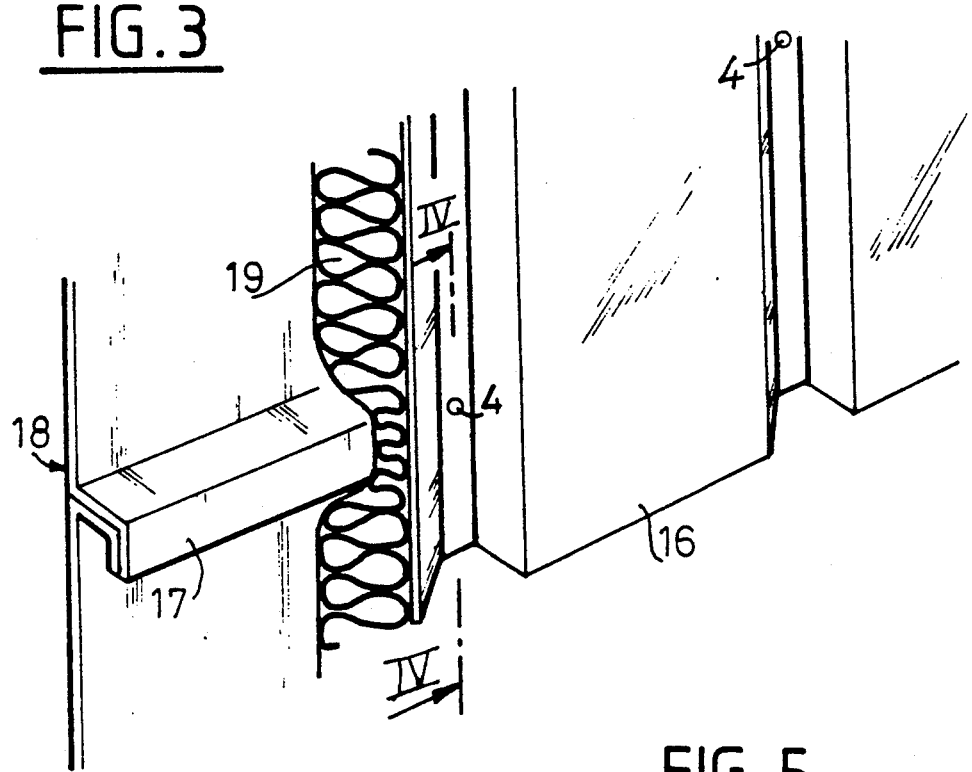
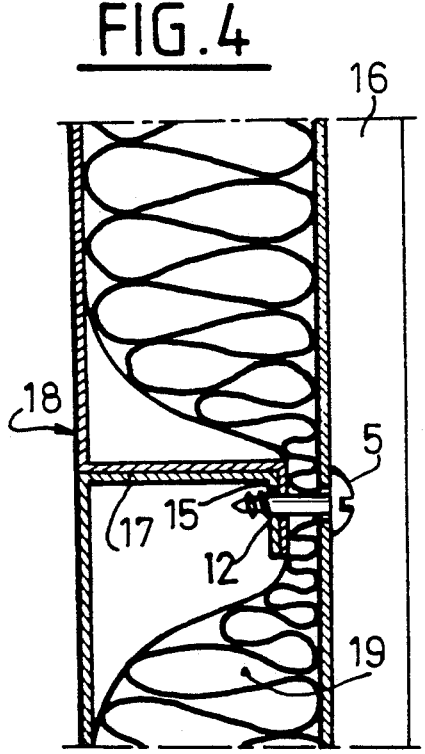
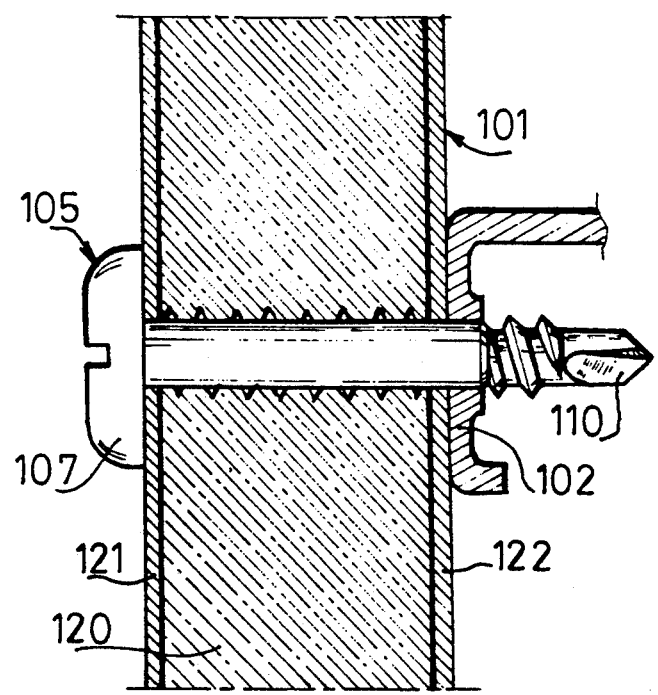

COMPOSITE STRUCTURE, ESPECIALLY FOR BUILDING

BACKGROUND OF THE INVENTION

The present invention relates to a composite structure, in which a layer is fastened to a metal sheet the back of which is inaccessible. Such structure is used particularly for the installation of insulating coverings or claddings of facades in the building sector.

An insulating covering, for example, insulating coverings includes an insulating layer consisting of panels and a sealing lining, the assembly as a whole being fastened to a roof carrier element formed of ribbed metal sheets fastened to a framework. At the present time, use is made of self-drilling and -tapping countersunkhead screws of small diameter (diameter 3 mm to diameter 6 mm), of a length greater than the thickness of the insulating panels (10 to 30 mm more) and fastened by means of threads in the upper areas of the ribbed metal sheets. A metal distribution washer having a pierced and countersunk central cup and of small thickness and large diameter (approximately 70 mm) is interposed between each screw head and the upper face of the insulating panel. The sealing lining is subsequently adhesively bonded or welded to the upper face of the insulating panels and to the distribution washers which are theoretically in the upper plane of the insulating panels.

One version involves employing the fastenings, comprising a washer and screw, after the installation of a first sealing membrane. A second membrane subsequently covers the first membrane and the visible washers and screw heads. Another version involves employing the fastenings, comprising washers of elongate shape and the screws, along the edge of a width of a sealing lining. An adjacent width subsequently covers the first width and all the visible washers and screw heads.

The use of such screws is far from satisfactory. The screws are installed by means of an electric screwdriver of rapid rotational speed and high torque. It often happens, especially if the insulating panels are dense and scarcely compressible and if the metal sheet is thin, that the screw, once it has come into abutment on its washer, continues to rotate without being capable of penetrating. Consequently, the diameter of the hole in the metal sheet becomes equal to the outside diameter of the threads of the screw, and the fastening is no longer effective.

For the same reasons of high screwing speed and/or torque, the screw can be screwed too deeply into the ribbed metal sheet, the screw head being driven, together with the distribution washer which may even bend, into the insulating panel. In such case, the sealing lining is not applied onto a continuous and flat support, thus impairing its proper functioning. This phenomenon becomes more serious if the insulation used is highly compressible, for example panels of mineral wool. Moreover, an aesthetic defect appears on the underside of the roof. That is the screw deforms the area of ribbed metmetal sheet upwards, with the result that such sheet no longer is plane.

Furthermore, even if the screw is correctly installed, when the roof is completed the screw can be forced in by one or more thread flights in the region of the ribbed metal sheet under the effect of a load, for example when a person walks on the distribution washer and the screw head. In such case, the external threads of the screw enlarge the hole in the metal sheet, and the fastening is no longer effective.

To overcome these disadvantages and to guarantee a high reliability of the fastening, whatever the compressibility of the insulating panels, composite structures of the type comprising a layer fastened to a metal sheet by at least one fastening device have been proposed, Such device includes, on the one hand, a threaded assembly member consisting of a rod having at one end thereof a head for driving the rod in rotation, a threaded part at an opposite end and, between the threaded part and the head, a smooth part adjacent to the threaded part, and, on the other hand, a distribution element on which bears the head for driving such member in rotation. The length of the assembly member as far as the threaded part corresponds to the thickness of the layer and of the distribution element, if appropriate after a predetermined compression of the layer, plus the length of a deformation flange of the metal sheet.

U.S. Pat. No. 4,453,361 describes a structure of this type, in which the diameter of the smooth part of the assembly member is reduced substantially to the threadroot diameter of the threaded part.

This design has serious disadvantages:

the assembly member can oscillate freely in the hole in the metal sheet, and therefore it is impossible to fasten in this way either a vertical cladding or a flexible insulating layer surmounted by a sealing membrane which would quickly form folds;

moist air can infiltrate between the hole in the metal sheet and the smooth part and cause corrosion of the metal sheet. When rust has developed, the tearing resistance of the sheet falls sharply;

the assembly member is not safeguarded against inopportune unscrewing under the effect of vibrations.

SUMMARY OF THE INVENTION

The object of the invention is to eliminate these disadvantages by ensuring a firm positioning of the axis of the assembly member and protection against corrosion and against unscrewing.

To achieve and subject, the invention provides a composite structure of the abovementioned type, but wherein the diameter of the smooth part of the assembly member is markedly larger than the threadroot diameter of its threaded part. Thus, a flange is internally upset and substantially mates with the smooth part.

According to other characteristics:

the diameter of the smooth part is approximately equal to half the sum of the said thread-root diameter and of the outside diameter of the thread;

the assembly member terminates beyond the threaded part in a self-drilling tip or alternatively in a drill bit;

the smooth part extends as far as the head of the assembly member;

the structure forms a building covering, the layer being an insulating layer, if appropriately surmounted by a sealing membrane, the head of each assembly member bearing on a washer forming the distribution element, and if appropriate the fastening device being covered by the sealing membrane;

the structure forms a facade lining;

the layer comprises a cladding and an intermediate insulating jacket of predetermined compression, the metal sheet forming a supporting skeleton for the cladding;

the layer comprises rigid panels, the metal sheet forming a supporting skeleton, especially in the form of longitudinal members, for such panels.

BRIEF DESCRIPTION OF THE DRAWINGS

Some exemplary embodiments of the invention will now be described with reference to the accompanying drawings, in which:

FIG. 1 is a section showing the fastening of an insulating layer to a supporting metal sheet for the covering of a building, according to the invention;

FIG. 2 is a section showing a detail of such fastening on a larger scale;

FIG. 3 is perspective cut away view showing the fastening of a building facade cladding to a supporting skeleton, according to the invention;

FIG. 4 is a view taken in section along the line IV—IV of FIG. 3; and

FIG. 5 is a section illustrating another use of the invention in a manner similar to that of FIG. 1.

DETAILED DESCRIPTION OF THE INVENTION

FIG. 1 shows the fastening of an insulating panel 1 of thickness e, surmounted by a sealing membrane 1A, to a ribbed metal sheet 2 previously fastened to the framework 3 of a building. This fastening is carried out on corrugation crests of the metal sheet 2 by means of devices 4, each consisting of an assembly member 5, which will be designated hereinafter by the term "screw" for the sake of convenience, and of a distribution washer 6. The screws 5 and the metal sheet 2 have corrosion-proof coatings.

The screw 5 comprises a countersunk head 7 at its upper end, a threaded lower end part 8 located under the metal sheet 2 and, between the head 7 and part 8, a smooth cylindrical body 9. The threaded part 8 is extended downwards by a self-drilling cutting tip 10. The screw 5 is produced in a conventional way simply by the non-cutting deformation of a rod having the diameter of the body 9, so that the latter (FIG. 2) has a diameter a which is intermediate between the thread-root diameter b and the outside diameter c of the part 8 and which can, in particular, be approximately equal to $(b+c)/2$. Moreover, the height 1 of the head 7 and of the body 9 is in the neighbourhood of the thickness e to be fastened, as will be explained in more detail below.

The washer 6 is circular or of elongate shape and has a countersunk central hole 11, the periphery of which is matched to the screw head 7.

The use of the device 4 by means of an electric screwdriver includes a sequence of the following operations assumed to be conducted along one edge of two widths of the sealing lining 1A:

installation of the distribution washer 6 on the upper face of the edge of one width 14A of the membrane 1A;

installation of the screw 5 in the hole 11 of the washer and through the width 14A and the insulating layer 1;

drilling of the metal sheet 2 by the rotation of the tip 10. The metal sheet 2 is thus deformed locally downwards;

screwing of the threaded part 8 into the metal sheet 2 until a thread head 12, including the junction of the body 9 of the screw and of the threaded part 8, has projected downwards beyond the drilled hole which at such time has the same diameter b as the thread root of the threaded part 8;

the screw then rotates rapidly on itself, driven by the screwdriver. Since the diameter a of the body 9 of the screw is markedly larger than the diameter b and therefore larger than the diameter of the drilled hole, the latter is widened by radial upsetting and forms a flange 15, the inner surface of which is approximately smooth and closely mates over its entire height h with the smooth part 9. The height h is in all cases markedly larger than the thickness of the metal sheet 2, and the diameter d of the flange is equal to a.

Thereafter, the screw does not continue to penetrate. The thread head 12 remains substantially in the plane of the lower face of the metal sheet 2, and the flange 15 forms a bearing which firmly positions the axis X—X of the screw 5, while allowing the screw to rotate about such axis and slide axially thereof.

When all the devices 4 are in place, the edge of a second width 14B of the sealing membrane 1A is finally adhesively bonded or welded to the edge of the first width and to the washers 6.

Under the effect of a load applied vertically to the screw, the screw 5, as well as the washer 6 can penetrate into the insulating panel 1 without any subsequent loss of tearing resistance. Moreover, as a result of the vertical guidance ensured by the flange 15, the sealing membrane does not risk being folded. Furthermore, the close contact between the flange 15 and the body 9 protects the assembly against corrosion, even though, due to the screwing of the screw 5, the flange 15 does not have a corrosion-proof coating.

It will also be noted that the screws 5, once in place, are unscrewable, since the upsetting of the flange 15 has virtually eliminated the threads cut into the metal sheet by the threaded part 8.

The exact length 1 of the head 7 and of the body 9 is calculated so that, when the thread head 12 butts against the metal sheet 2, the upper surface of the screw head 7 is in the plane of the upper face of the washer 6. The length 1 must therefore take into account the length h of the flange 15.

FIGS. 3 and 4 show the use of the invention for the fastening by means of devices 4 of a metal cladding 16 having vertical corrugations to horizontal ribs 17 of a metal skeleton 18, with a flexible insulating jacket 19, for example consisting of mineral wool, being interposed, for the purpose of lining a building facade. The use of screws according to the invention makes it possible to compress the jacket 19 only to a predetermined extent at the location of the fastenings, as can be seen clearly in FIG. 4, the thread head 12 coming into abutment behind the ribs 17. The planeness of the outer face of the cladding can thus be improved. It will be appreciated that the heads of screws 5 bear directly on the cladding 16. The flanges 15 keep the screws 5 in the horizontal position.

FIG. 5 illustrates the use of a screw 105 similar to that of FIG. 1, but with a flat head 107, for fastening a structure 101 of low compressibility, for example a vertical sandwich structure comprising a plaster or wooden panel 120 and two skins 121, 122, to a thick supporting metal sheet 102, such as a longitudinal member. In this case, the screw 105 preferably terminates in a drill bit 110. If necessary, a flexible sealing washer (not shown) can be pressed between the head 107 and the outer skin 121 which itself serves as a clampingforce distribution element, in the same way as the cladding 16 in the example of FIGS. 3 and 4.

It was found, surprisingly, that the tearing resistance of the fastening device according to the invention is virtually the same as that of conventional screws, the thread of which remains in engagement with the supporting metal sheet.

We claim:

1. A composite structure comprising:
   a metal sheet;
   a layer of material;
   at least one fastening device fastening said layer to said metal sheet, said fastening device comprising a rod-shaped member having first and second opposite ends, a head at said first end for enabling rotation of said member, a threaded portion at said second end for threading through said metal sheet upon rotation of said member, said threaded portion including a thread having a thread-root diameter, and a smooth portion between said head and said threaded portion and immediately adjacent said threaded portion;
   said fastening device being extended through said layer of material with said head bearing toward a side of said layer of material remote from said metal sheet and with said threaded portion threaded through and entirely beyond said metal sheet; and
   said smooth portion having a diameter, at least immediately adjacent said threaded portion, substantially greater than said thread-root diameter of said thread, such that upon said fastening device being rotated with said threaded portion threaded beyond said metal sheet said smooth portion internally upsets said metal sheet and forms integral therewith a flange having an internal surface substantially complementary to and mating with said smooth portion and forming a guide therefor.

2. A structure as claimed in claim 1, wherein said internal surface of said flange is substantially free of threads.

3. A structure as claimed in claim 1, wherein said rod-shaped member has a length exclusive of said threaded portion substantially equal to a thickness of said layer of material plus an axial length of said flange.

4. A structure as claimed in claim 1, wherein said diameter of said smooth portion is approximately equal to half the sum of said thread-root diameter plus an outer diameter of said thread.

5. A structure as claimed in claim 1, further comprising a force distribution member bearing on said side of said layer of material, said fastening member extending through said force distribution member with said head bearing thereon.

6. A structure as claimed in claim 5, wherein said force distribution member comprises a washer.

7. A structure as claimed in claim 1, wherein said rod-shaped member further includes at said second end thereof a self-drilling tip extending beyond said threaded portion.

8. A structure as claimed in claim 1, wherein said rod-shaped member further includes at said second end thereof a drill bit extending beyond said threaded portion.

9. A structure as claimed in claim 1, wherein said smooth portion has said diameter from said threaded portion to said head.

10. A structure as claimed in claim 1, wherein said layer of material comprises insulation for a building covering.

11. A structure as claimed in claim 10, further comprising a sealing membrane covering said layer of material and said head of said fastening device.

12. A structure as claimed in claim 1, comprising a facade lining.

13. A structure as claimed in claim 12, wherein said metal sheet comprises a supporting skeleton, and said layer of material comprises a cladding and an insulating jacket positioned between said cladding and said skeleton.

14. A structure as claimed in claim 12, wherein said metal sheet comprises a supporting skeleton, and said layer of material comprises rigid panels.

15. A structure as claimed in claim 3, wherein said layer is of compressible material and said thickness is a thickness of said layer after a predetermined compression thereof.

16. A structure as claimed in claim 12, wherein said metal sheet comprises a supporting skeleton, and said layer of material comprises a compressible material compressed to a predetermined extent.

* * * * *